(12) United States Patent
Watanabe et al.

(10) Patent No.: US 11,820,862 B2
(45) Date of Patent: Nov. 21, 2023

(54) ORGANIC FLUORINE COMPOUND, LUBRICANT, AND PROCESSING METHOD OF MAGNETIC RECORDING MEDIUM

(71) Applicant: SHOWA DENKO K.K., Tokyo (JP)

(72) Inventors: Kentaro Watanabe, Tokyo (JP); Yasuyuki Ueda, Tokyo (JP); Kenzo Hanawa, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 1002 days.

(21) Appl. No.: 16/625,870

(22) PCT Filed: Jun. 27, 2018

(86) PCT No.: PCT/JP2018/024334
§ 371 (c)(1),
(2) Date: Dec. 23, 2019

(87) PCT Pub. No.: WO2019/004274
PCT Pub. Date: Jan. 3, 2019

(65) Prior Publication Data
US 2020/0131310 A1    Apr. 30, 2020

(30) Foreign Application Priority Data
Jun. 30, 2017    (JP) ................................ 2017-128567

(51) Int. Cl.
| C08G 65/321 | (2006.01) |
| G11B 5/84 | (2006.01) |
| C08G 65/32 | (2006.01) |
| C08G 65/00 | (2006.01) |
| C08G 65/337 | (2006.01) |
| C08G 65/334 | (2006.01) |
| C10M 147/04 | (2006.01) |
| C08F 299/02 | (2006.01) |
| G11B 5/725 | (2006.01) |
| C10M 107/38 | (2006.01) |

(52) U.S. Cl.
CPC .......... *C08G 65/321* (2013.01); *C08F 299/02* (2013.01); *C08G 65/007* (2013.01); *C08G 65/32* (2013.01); *C08G 65/337* (2013.01); *C08G 65/3344* (2013.01); *C10M 147/04* (2013.01); *G11B 5/7257* (2020.08); *G11B 5/84* (2013.01); *G11B 5/8408* (2013.01); *C10M 107/38* (2013.01)

(58) Field of Classification Search
CPC .......... C10M 147/04; C10M 2201/041; C10M 107/38; C10M 2213/06; C08G 65/337; C08G 65/007; C08G 65/32; C08G 65/3344; C08G 65/321; G11B 5/84; G11B 5/7257; G11B 5/8408; C08F 299/02; C10N 2030/06; C10N 2040/18; C10N 2020/04; C10N 2050/023
See application file for complete search history.

(56) References Cited

U.S. PATENT DOCUMENTS

| 5,055,359 A | 10/1991 | Tsuno et al. |
| 10,343,972 B2 | 7/2019 | Igarashi et al. |
| 2012/0021253 A1 | 1/2012 | Nakata et al. |
| 2012/0190603 A1* | 7/2012 | Shirakawa ........... C10M 107/38 508/580 |
| 2014/0107278 A1 | 4/2014 | Ozaki et al. |
| 2015/0148509 A1 | 5/2015 | Sakoh et al. |
| 2016/0159686 A1* | 6/2016 | Park ...................... C09D 5/28 522/18 |
| 2016/0222170 A1 | 8/2016 | Muto et al. |
| 2018/0086771 A1 | 3/2018 | Igarashi et al. |
| 2019/0084911 A1 | 3/2019 | Yagyu et al. |

FOREIGN PATENT DOCUMENTS

| JP | S62-066417 | 3/1987 |
| JP | H09-282642 | 10/1997 |
| JP | 2008-075000 | 4/2008 |
| JP | 2010-235651 | 10/2010 |
| JP | 2011-093981 | 5/2011 |
| JP | 2011-140480 | 7/2011 |
| JP | 2015-101624 | 6/2015 |
| WO | 2012/173088 | 12/2012 |
| WO | 2015/125940 | 8/2015 |

(Continued)

OTHER PUBLICATIONS

Office Action dated Aug. 3, 2022 issued with respect to the related U.S. Appl. No. 16/625,860.
Denis E. Markov et al., "Accurate Measurement of the Exciton Diffusion Length in a Conjugated Polymer Using a Heterostructure with a Side-Chain Cross-Linked Fullerene Layer", Journal of Physical Chemistry A, Jun. 2005, vol. 109, No. 24, pp. 5266-5274.
Takashi Nakanishi et al., "Superstructures and superhydrophobic property in hierarchical organized architectures of fullerenes bearing long alkyl tails", Journal of Materials Chemistry, 2010, vol. 20, No. 7, pp. 1253-1260.

(Continued)

*Primary Examiner* — Vishal V Vasisth
(74) *Attorney, Agent, or Firm* — IPUSA, PLLC

(57) ABSTRACT

According to one aspect of the present invention, an organic fluorine compound is represented by a general formula $$(R\text{-}\pi\text{-}E\text{-}CH_2)_2\text{-}A \tag{1A}$$

(where A is a divalent perfluoropolyether group, π is an arylene group or a single bond, R is an alkenyl group or an alkynyl group, and E is an ether bond or an ester bond or a group that is represented by a chemical formula $$\text{—O—CH}_2\text{CH(OH)CH}_2\text{O—}$$

two groups each of which is represented by a general formula $$R\text{-}\pi\text{-}E\text{-}CH_2\text{—}$$

may be the same or different, and at least one n among two π is an arylene group).

12 Claims, No Drawings

(56) References Cited

FOREIGN PATENT DOCUMENTS

| | | |
|---|---|---|
| WO | 2017/006812 | 1/2017 |
| WO | 2017/154403 | 9/2017 |

OTHER PUBLICATIONS

International Search Report for PCT/JP2018/024339 dated Sep. 18, 2018.
International Search Report for PCT/JP2018/024334 dated Aug. 28, 2018.

* cited by examiner

ORGANIC FLUORINE COMPOUND, LUBRICANT, AND PROCESSING METHOD OF MAGNETIC RECORDING MEDIUM

This application is a 371 of PCT/JP2018/024334 filed Jun. 27, 2018.

TECHNICAL FIELD

The present disclosure relates to an organic fluorine compound, a lubricant, and a processing method of a magnetic recording medium.

BACKGROUND ART

Because a perfluoropolyether compound has a large viscosity index, in addition to being excellent in heat resistance, chemical resistance, and oxidation resistance, a small variation in fluidity (viscosity) over a wide temperature range from low temperature to high temperature, and demonstrates favorable lubricity. Further, a perfluoropolyether compound has properties such as being fireproof, not substantially influencing a high-molecular material such as rubber or plastic, low vapor pressure, low evaporation loss, low surface tension, and high electric insulation, and is known to demonstrate high performance over an extremely wide range as a lubricant. Thus, a perfluoropolyether compound is widely used for various purposes such as lubricating oil such as vacuum pump oil, a lubricant for a magnetic disk/tape or the like, a heating medium, and a non-adhesive agent.

As an example of using an organic fluorine compound including a perfluoropolyether group as a lubricant, a disk-like substrate that is used as a magnetic recording medium can be exemplified.

A magnetic recording medium is, in general, obtained by stacking a recording layer and the like on a substrate, thereafter, forming a protective layer of carbon or the like on the recording layer, and further forming a lubricant layer on the protective layer. The protective layer has a function to protect information recorded in the recording layer, and to increase sliding of a magnetic head that reads data.

However, durability of the magnetic recording medium cannot be sufficiently obtained only by providing the protective layer on the recording layer.

Thus, in general, a lubricant layer is formed by applying an organic fluorine compound including a perfluoropolyether group on a surface of the protective layer as a lubricant. Thereby, durability is enhanced because a direct contact between the magnetic head and the protective layer can be prevented, and frictional force of the magnetic head that slides on the magnetic recording medium can be extremely reduced.

As a lubricant that is used for a magnetic recording medium, for example, an organic fluorine compound that is represented by a chemical formula

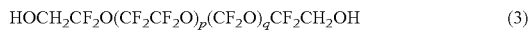

(where p and q are each an integer of greater than or equal to 1) is known. Examples of the organic fluorine compound described above include FOMBLIN (registered trademark) Zdol (manufactured by Solvay Specialty Polymers).

Patent Document 1 discloses a magnetic recording medium in which a lubricant as described above is applied on a protective layer.

Further, Patent Document 2 discloses a magnetic recording medium including a lubricant layer made of an organic fluorine compound FOMBLIN Ztetraol (manufactured by Solvay Specialty Polymers) represented by a chemical formula

(where m and n are integers, and the average molecular weight of the compound that is represented by the chemical formula (4) is 500 to 5000).

Further, Patent Document 3 discloses a magnetic recording medium in which a lubricant solution including an organic fluorine compound that is represented by the following chemical formula (5) and a solvent is applied on a protective layer.

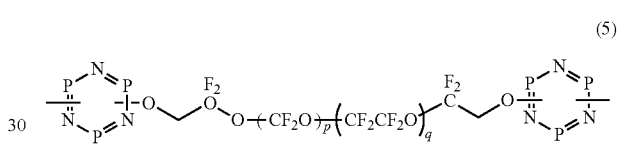

Here, p and q are each an integer greater than or equal to 1.

Each of the organic fluorine compounds used in the lubricants of the chemical formulas (3) to (5) contain a straight chain perfluoropolyether group, but do not contain an aromatic ring in the molecule.

Also, Patent Document 4 discloses a magnetic recording medium including a lubricant layer of an organic fluorine compound FOMBLIN AM2001 (manufactured by Solvay Specialty Polymers) that is represented by the following chemical formula (6).

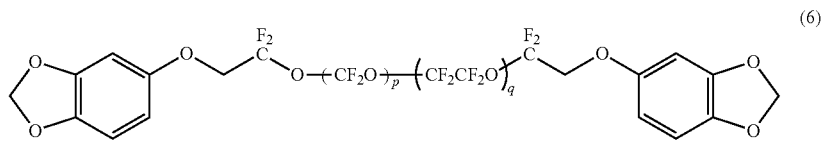

Here, p and q are each an integer greater than or equal to 1.

Although organic fluorine compounds that are used in these lubricants contain, at the ends of a linear perfluoropolyether group, a phenyl group having a substituent in the molecule, oxygen atoms bonded to adjacent carbon atoms constituting the phenyl group form a ring via a methylene group.

PRIOR ART DOCUMENT

Patent Document

[Patent Document 1] Japanese Laid-open Patent Publication No. S62-66417
[Patent Document 2] Japanese Laid-open Patent Publication No. H9-282642

[Patent Document 3] Japanese Laid-open Patent Publication No. 2008-75000
[Patent Document 4] U.S. Pat. No. 5,055,359

SUMMARY OF THE INVENTION

Problem to be Solved by the Invention

In order to use an organic fluorine compound including a perfluoropolyether group as a lubricant on a disk-like substrate that is used as a magnetic recording medium, for example, it is necessary to form a lubricant layer on a protective layer and thereafter fix the lubricant on the protective layer so that the lubricant does not dissipate over time.

In order to adsorb a lubricant on a protective layer to form a lubricant layer, in general, a nitriding process is performed on the protective layer.

An organic fluorine compound, which is described in each of Patent Documents 1 and 2, has a hydroxy group at an end of the molecule, the hydroxy group can form a hydrogen bond with a nitrogen atom provided on the protective layer. Therefore, the organic fluorine compound adsorbs on the protective layer and the lubricant layer is formed.

On the other hand, not performing a nitriding process on a protective layer is considered as usable to reduce a production cost, because the number of steps is reduced. Further, an increase in polarity can be suppressed due to addition of nitrogen atoms whose electronegativity is large to the protective layer whose main constituents are carbon atoms and hydrogen atoms in general, polarity increased. Therefore, it is considered that there is a merit of enhancing resistance to corrosion due to humidity in air or the like.

However, in a case where a lubricant as described above is applied on a protective layer to which a nitriding process is not applied, a hydrogen bond is not formed between the protective layer and the lubricant. Therefore, although a small amount of the lubricant is adhered based on a high viscosity, there is a problem that a lubricant layer having a sufficient thickness cannot be formed.

The protective layer is constituted by carbon atoms or diamond-like carbon (DLC) containing carbon atoms. It is known that a part of the carbon atoms in the DLC has $sp^2$ hybrid orbitals, and the DLC includes double bonds similar to bonds of carbon atoms in graphite.

Therefore, it is considered to adsorb a lubricant on a protective layer to which a nitriding process is not applied, by n-n stacking interactions with an adsorption portion in the lubricant using double bonds.

Because the organofluorine compounds described in Patent Documents 3 and 4 respectively contain, at their ends, a phosphazene ring group and a 1,3-benzodioxol group that are ring structures containing alternately a single bond and a double bond, it is considered that, at first glance, the organofluoric compounds can be adsorbed by n-n stacking interactions on a protective layer to which a nitriding process is not applied.

However, because these ring structures contain non-aromatic rings, the flatness of the ring structures is impaired. Therefore, there is a problem that, for these lubricants, n-n stacking interactions with a protective layer to which a nitriding process is not applied are insufficient, and it is impossible to form a lubricant layer having a sufficient thickness.

Therefore, it is considered that by using a lubricant in which ring structures at the ends are consisting of only aromatic rings and that can be assumed to be substantially flat, the lubricant can be adsorbed, by effective n-n stacking interactions, on a protective layer to which a nitriding process is not applied.

On the other hand, in a case where a lubricant layer is formed on a protective layer of a magnetic recording medium, such as a magnetic disk, some lubricant on the protective layer is removed each time the magnetic head flies. As a result, the lubricant layer gradually becomes thinner, ultimately leading to a crash in some cases. In order to suppress such a phenomenon, the amount of lubricant fixed to the protective layer is required to be higher than a predetermined rate, that is, the bonded ratio of the lubricant layer is required to be high.

The bonded ratio of the lubricant layer is a rate of the lubricant remaining after a magnetic disk formed with the lubricant layer is immersed in a solvent and the lubricant that is not fixed on the protective layer is washed away.

At this time, there is a problem that it is difficult to obtain a sufficient bonded ratio by only n-n stacking interactions that act when a lubricant in which ring structures at the ends are consisting of only aromatic rings adsorbs on the protective layer to which a nitriding process is not applied.

In view of the above, it is an object in one aspect of the present invention to provide an organic fluorine compound so that it is possible to form a lubricant layer having a sufficient thickness on a protective layer to which a nitriding process is not applied and it is possible to increase the bonded ratio of the lubricant layer.

Means for Solving the Problem

[1] An organic fluorine compound is represented by a general formula

(where A is a divalent perfluoropolyether group, π is an arylene group or a single bond, R is an alkenyl group or an alkynyl group, and E is an ether bond or an ester bond or a group that is represented by a chemical formula

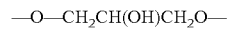

two groups each of which is represented by a general formula

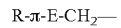

may be the same or different, and at least one n among two π is an arylene group).

[2] The organic fluorine compound according to [1], wherein the A is a straight chain group.
[3] The organic fluorine compound according to [1] or [2], wherein a plurality of the R are the same.
[4] The organic fluorine compound according to any one of [1] to [3], wherein a plurality of the n are the same.
[5] The organic fluorine compound according to any one of [1] to [4], wherein a plurality of the E are the same.
[6] The organic fluorine compound according to any one of [1] to [5], wherein a carbon number of the A is 1 to 100.
[7] The organic fluorine compound according to any one of [1] to [6], wherein the A includes at least one of groups each of which is represented by a general formula

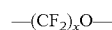

(where x is an integer of 1 to 5).

[8] The organic fluorine compound according to [7], wherein the A includes 1 to 50 groups each of which is represented by the general formula (2) in which the x is 1 or 2.

[9] The organic fluorine compound according to any one of [1] to [8], wherein an average formula weight of the A is in a range of 250 to 6000.

[10] The organic fluorine compound according to any one of [1] to [9], wherein the organic fluorine compound is a compound that is represented by a chemical formula (C1)

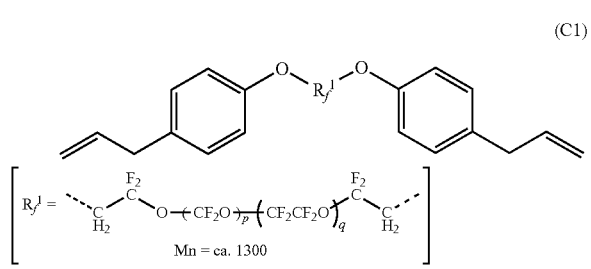

a compound that is represented by a chemical formula (C6)

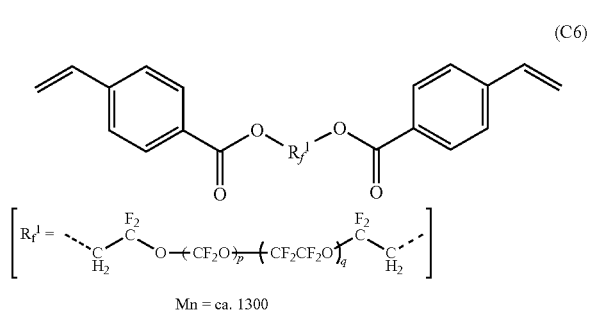

a compound that is represented by a chemical formula (C7)

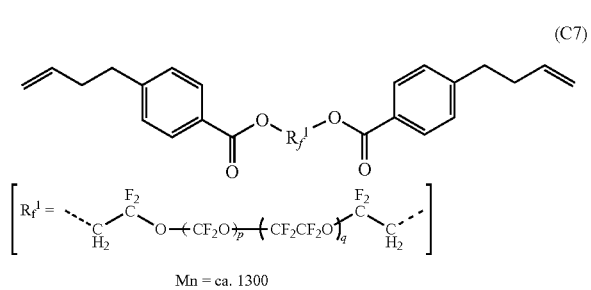

a compound that is represented by a chemical formula (C8)

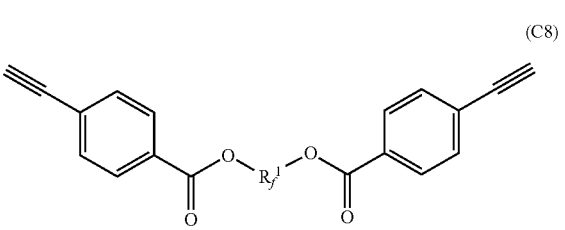

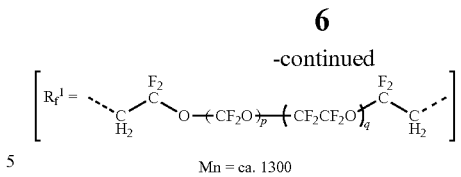

a compound that is represented by a chemical formula (C9)

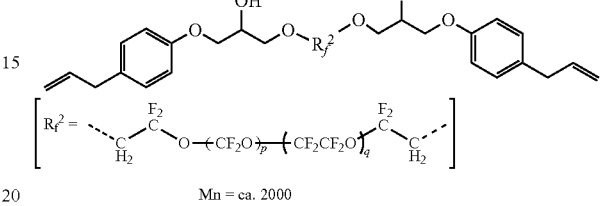

a compound that is represented by a chemical formula (C10)

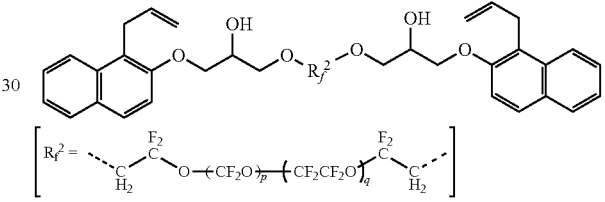

or a compound that is represented by a chemical formula (C12)

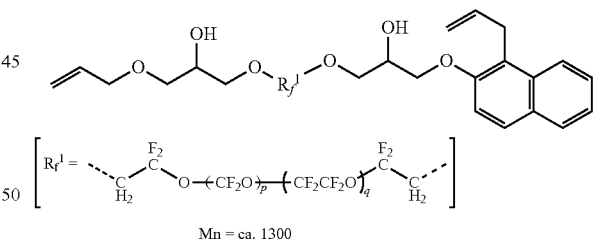

[11] A lubricant containing the organic fluorine compound according to any one of [1] to [10].

[12] A processing method of a magnetic recording medium includes: applying the lubricant according to [11] to the magnetic recording medium; and irradiating the lubricant applied to the magnetic recording medium with ultraviolet light.

Effect of the Invention

According to one aspect of the present invention, it is possible to provide an organic fluorine compound so that it is possible to form a lubricant layer having a sufficient thickness on a protective layer to which a nitriding process is not applied and it is possible to increase the bonded ratio of the lubricant layer.

EMBODIMENT FOR CARRYING OUT THE INVENTION (Organic Fluorine Compound)

An organic fluorine compound according to the present embodiment is a compound that is represented by a general formula $$(R-\pi-E-CH_2)_2-A \qquad (1A)$$

(where A is a divalent perfluoropolyether group, π is an arylene group or a single bond, R is an alkenyl group or an alkynyl group, and E is an ether bond or an ester bond or a group that is represented by a chemical formula $$—O—CH_2CH(OH)CH_2O—$$

two groups each of which is represented by a general formula $$R-\pi-E-CH_2—$$

may be the same or different, and at least one n among two π is an arylene group).

In the compound represented by the general formula (1A), it is preferable that every π is an arylene groups due to ease of synthesis.

Note that the perfluoropolyether group is a group in which a plurality of fluorocarbon groups are bonded by an ether bond.

In the following, unless otherwise noted, an organic fluorine compound according to the present embodiment will be described using an organic fluorine compound in which each of a plurality of π is an arylene group.

The organic fluorine compound according to the present embodiment has a structure in the molecule in which a divalent perfluoropolyether group is bonded via a linking group that is represented by a general formula $$-E-CH_2—$$

with an aryl group in which an alkenyl or an alkynyl group is directly bonded on an aromatic ring Because the organic fluorine compound according to the present embodiment contains an aromatic ring that can be considered to be substantially flat, based on π-π stacking interactions, the organic fluorine compound can be adsorbed on a protective layer to which a nitriding process is not applied, and a lubricant layer having a sufficient thickness can be formed. Furthermore, because the alkenyl group or the alkynyl group is attached directly on the aromatic ring, irradiation with ultraviolet light promotes formation of a strong bond between sp² hybridized carbon atoms between an unsaturated bond contained in the alkenyl group or the alkynyl group and the material constituting the protective layer (e.g., diamond-like carbon (DLC)). As a result, the lubricant layer on the protective layer can be sufficiently fixed, and the bonded ratio of the lubricant layer can be increased. Because aromatic rings also contain unsaturated bonds, a similar effect of increasing the bonded ratio is present, but aromatic rings alone do not have a sufficient effect to increase the bonded ratio.

Here, A may be either a straight chain group or a branched chain group, but is preferably a straight chain group. When A is a straight chain group, the lubricity and the solubility in a fluorine-based solvent are enhanced.

The carbon number of A is preferably 1 to 100, and is more preferably 5 to 40. When the carbon number of A is 1 or more, because the solubility of the organic fluorine compound in a fluorine-based solvent is enhanced, the organic fluorine compound can be easily applied. Also, when the carbon number of A is 100 or less, because the solubility of the organic fluorine compound in a general organic solvent is enhanced, a structural transformation due to an organic reaction of the organic fluorine compound is facilitated.

It is preferable that A includes at least one of groups each of which is represented by a general formula $$—(CF_2)_xO— \qquad (2)$$

(where x is an integer of 1 to 5).

This enhances the solubility of the organic fluorine compound in the fluorine-based solvent, and as a result, it is possible to apply the organic fluorine compound more uniformly.

It is also more preferable that A contains 1 to 50 groups each of which is represented by the general formula (2) where x is 1 or 2. A perfluoropolyether group having such a structure is industrially synthesized and can be easily obtained, and thus is industrially easy to use.

The average formula weight of A is preferably in the range of 250 to 6000, and is more preferably in the range of 280 to 3000. When the average formula weight of A is 250 or more, because the solubility of the organic fluorine compound in a fluorine-based solvent is enhanced, the organic fluorine compound can be easily applied. Also, when the average formula weight of A is 6000 or less, because the solubility of the organic fluorine compound in a general organic solvent is enhanced, a structural transformation due to an organic reaction of the organic fluorine compound is facilitated.

It is preferable that R is an alkenyl group having 2 to 4 carbon atoms or an alkynyl group having 2 to 4 carbon atoms.

Specific examples of R include a vinyl group, an allyl group, a 3-buten-1-yl group, and a propargyl group. Among these, a vinyl group, an allyl group, or a propargyl group is particularly preferable.

It is preferable that a plurality of R of the organic fluorine compound according to the present embodiment is the same. Thereby, the number of steps required for synthesis can be reduced.

E is an ether bond or an ester bond or a group that is represented by a chemical formula $$—O—CH_2CH(OH)CH_2O—$$

but is preferably an ester bond because it is easy to synthesize.

Here, although the orientation of the ester bond is not particularly limited, the orientation of a group that is represented by a general formula $$R-\pi-COO—CH_2—$$

is preferable because it is easy to synthesize.

It is preferable that a plurality of E of the organic fluorine compound according to the present embodiment is the same. Thereby, the number of steps required for synthesis can be reduced.

Examples of π include, but are not particularly limited to, a phenylene group, a naphthylene group, and the like. Among these, a 1,4-phenylene group and a 1,2-naphthylene group are particularly preferable.

It is preferable that a plurality of n of the organic fluorine compound according to the present embodiment is the same. Thereby, the number of steps required for synthesis can be reduced.

(Method of Synthesizing of Organic Fluorine Compound)

An organic fluorine compound according to the present embodiment can be synthesized, for example, according to the following synthesis method.

(Compound Represented by General Formula (TA))

[In Case where E is Ether Bond]

For example, a compound that is represented by the general formula (1A) can be synthesized by cross-coupling an alkoxide, which is generated by deprotonation of an existing perfluoropolyether compound having hydroxy groups at their ends with a base, with an aryl halide under the presence of a copper catalyst.

This reaction can be carried out, without the use of a solvent, and with heating and stirring as appropriate.

As the base, a generally known ionic base can be used, and examples of the base include potassium carbonate, cesium carbonate, potassium t-butoxide, and the like.

Also, as the copper catalyst, for example, a catalyst generated formed from copper (I) iodide and ethyl 2-cyclohexanone carboxylate can be used.

It is preferable that in the aryl halide, an alkenyl group or an alkynyl group is directly attached on an aromatic ring constituting the aryl group in advance.

Examples of the aryl halide include aryl iodides, and the like. Among these, 4-allyliodobenzene is particularly preferable.

[In Case where E is Ester Bond]

For example, a compound that is represented by the general formula (1A) can be synthesized by esterification of an existing perfluoropolyether compound having hydroxy groups at their ends with an acid chloride (for example, a carboxylic acid chloride) under the presence of a base. This reaction can be carried out in a solvent.

Alternatively, an existing perfluoropolyether compound having chlorinated carbonyl groups at their ends may be esterified with a compound having a hydroxy group as well.

Although the solvent is not particularly limited as long as it can dissolve a perfluoropolyether compound as described above, examples of the solvent include a chlorine-containing solvent such as dichloromethane and a fluorine-containing solvent such as AK-225 (manufactured by Asahi Glass Co., Ltd.).

As the base, generally known inorganic bases and organic bases can be used, and examples of the base include cesium carbonate, triethylamine, diisopropylamine, and the like.

[In Case where E is —O—CH$_2$CH(OH)CH$_2$—O—]

For example, a compound that is represented by the general formula (1A) can be synthesized by a ring-opening addition reaction of an existing perfluoropolyether compound having hydroxy groups at their ends with a compound in which a glycidyloxy group is directly bonded on an aromatic ring constituting an aryl group under the presence of a base. This reaction can be carried out in a solvent.

Although the solvent is not particularly limited as long as it can dissolve a perfluoropolyether compound having a hydroxy group and an ionic base, examples of the solvent include alcohol, such as methanol and t-butyl alcohol, a polar solvent, such as N,N-dimethylformamide, and the like.

As the base, a generally known ionic base can be used, and examples of the base include potassium carbonate, cesium carbonate, potassium t-butoxide, and the like.

[In Case where Two E are Different]

By combining methods as described above, a compound that is represented by the general formula (1A) can be synthesized.

For example, after cross-coupling an alkoxide, which is generated by deprotonation of an existing perfluoropolyether compound having hydroxy groups at their ends with a base, with an aryl halide under the presence of a copper catalyst, the unreacted hydroxy group is esterified with acid chloride under the presence of a base. Thereby, it is possible to synthesize a compound having an ether bond and an ester bond as two different E.

[Crude Product]

In each reaction, water or dilute hydrochloric acid is added to the reaction mixture, and as needed, a fluorine-containing solvent such as AK-225 (manufactured by Asahi Glass Co., Ltd.) is added as an extraction solvent for liquid separation, and the organic layer is dried. Thereafter, by being filtered and concentrated by a rotary evaporator, a crude product is obtained.

[Purification]

The crude product can be used as a lubricant. In a case where higher purity is required, for example, the crude product can be purified by silica gel column chromatography or a carbon dioxide supercritical fluid extraction method and then used as a lubricant.

In a case where a carbon dioxide supercritical fluid extraction method is used, for example, the crude product is placed into a pressure container. Thereafter, while maintaining pressure and temperature in the pressure container, by flowing liquefied carbon dioxide into the pressure container, carbon dioxide is made into the supercritical fluid state and the crude product is purified by extracting a desired compound.

It is preferable that the temperature in the pressure container is greater than or equal to 31° C. and less than or equal to 80° C. When the temperature in the pressure container is less than 31° C., the carbon dioxide does not enter a supercritical state. When the temperature exceeds 80° C., extraction property of the supercritical carbon dioxide becomes weak.

Further, it is preferable that the pressure in the pressure container is greater than or equal to 7.38 MPa and less than or equal to 30 MPa. When the pressure in the pressure container is less than 7.38 MPa, the carbon dioxide does not enter a supercritical state. When the pressure in the pressure container exceeds 30 MPa, because pressure resistance property of the device is required, the price of the device increases, and as a result, manufacturing cost increases.

(Lubricant)

A lubricant according to the present embodiment includes the organic fluorine compound according to the present embodiment.

The lubricant according to the present embodiment may be the organic fluorine compound according to the present embodiment or may include another organic fluorine compound in addition to the organic fluorine compound according to the present embodiment.

As another organic fluorine compound, although not particularly limited, for example, an organic fluorine compound that is conventionally known as a lubricant can be used.

As a commercial product of another organic fluorine compound, for example, FOMBLIN (registered trademark) series (manufactured by Solvay Specialty Polymers) and the like may be exemplified.

The content of the organic fluorine compound according to the present embodiment in the lubricant is preferably greater than or equal to 0.1% by mass, is more preferably greater than or equal to 1% by mass, and is particularly preferably greater than or equal to 10% mass, in order to actualize more favorable adsorptivity.

The lubricant according to the present embodiment can be, as needed, dissolved in a solvent or dispersed in a dispersion medium to form a solution or a dispersion liquid, and then applied to a surface of a magnetic recording medium, such as a magnetic disk.

The method of applying (a solution or dispersion liquid of) a lubricant is not particularly limited, but for example, a spin-coating method, a dipping method, or the like can be used.

In a case where a dipping method is used to apply (a solution or dispersion liquid of) a lubricant to the surface of a magnetic recording medium, for example, the magnetic recording medium is immersed in (the solution or dispersion liquid of) the lubricant placed in an immersion tank of a dipping coating device, and then the magnetic recording medium is pulled up from the immersion tank at a predetermined speed.

It is preferable that the content of the organic fluorine compound according to the present embodiment in the solution or dispersion liquid of the lubricant is greater than or equal to 0.005% by mass.

Here, as described above, after applying (the solution or dispersion liquid of) the lubricant according to the present embodiment, it is preferable to perform irradiation with ultraviolet light. Thereby, it is possible to form a lubricant layer having a sufficient thickness on a protective layer to which a nitriding process is not applied and it is possible to increase the bonded ratio of the lubricant layer.

EXAMPLES

The present invention will be specifically described based on examples in the following. However, the present invention is not limited to the following examples.

($^1$H-NMR)

A sample (approximately 10 mg to 30 mg) was dissolved in a CDCl$_3$/hexafluorobenzene mixed solvent (approximately 0.5 mL) and it was placed in an NMR sample tube having a diameter of 5 mm. Thereafter, $^1$H-NMR spectrum was measured using a Fourier Transform Nuclear Magnetic Resonance System JNM-EX270 (manufactured by JEOL, Ltd.) at room temperature. At this time, to the CDCl$_3$/hexafluorobenzene mixed solvent, tetramethylsilane was added as a reference material.

Example 1

Organic fluorine compounds according to the present embodiment were synthesized according to the following synthesis examples.

Synthesis Example 1

Synthesis of Compound 1 (C1): [Reaction Formula (7)]

An organic fluorine compound FOMBLIN Zdol whose number average molecular weight (Mn) is approximately 1300 (manufactured by Solvay Specialty Polymers) (3.9 g, 3 mmol), copper (I) iodide (72 mg, 0.38 mmol), ethyl 2-cyclohexanonecarboxylate (0.12 g, 0.71 mmol), and 4-allyliodobenzene (0.62 g, 2.6 mmol) were mixed, thereafter, while stirring, cesium carbonate (3.7 g, 11 mmol) was added and stirring was conducted at 100° C. for 18 hours. Next, the reaction mixture was separated by dilute hydrochloric acid (20 mL) and a fluorine-based solvent AK-225 (manufactured by Asahi Glass Co., Ltd) (20 mL), and the aqueous phase was extracted twice by AK-225 (20 mL). After water washing the organic phase, magnesium sulfate was added and it was dried and filtered. Next, the filtrate was concentrated by a rotary evaporator to obtain a crude product (4.5 g) as an orange brown oily substance. Next, through purification by silica gel column chromatography (developing solvent: hexane-ethyl acetate (9:1 to 5:1)), a compound 1 (C1) was obtained as a colorless oily substance (51 mg, 33 μmol, yield 1.1%).

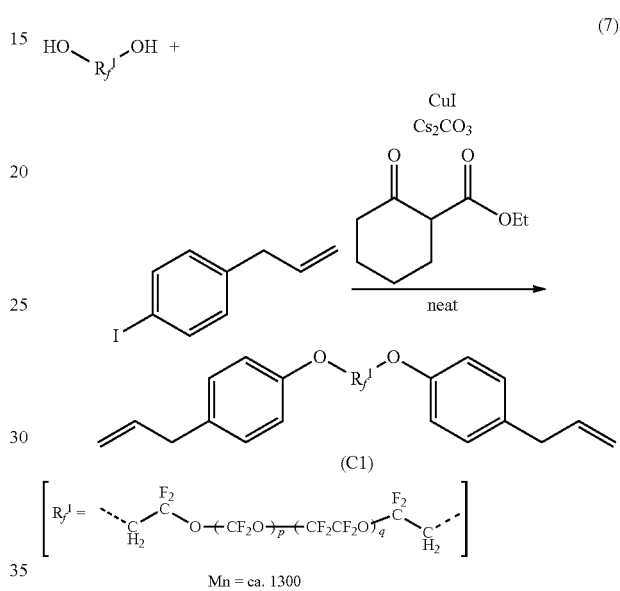

(7)

Here, p and q are an average degree of polymerization and the order of (CF$_2$O) and (CF$_2$CF$_2$O) in R$_f^1$ is arbitrary.

It was confirmed by the peaks of $^1$H-NMR spectrum that the colorless oily substance was the compound 1.

(Compound 1)

Peaks of $^1$H-NMR spectrum δ [ppm]: 3.34 (d, 4H), 4.30 (br, 4H), 5.02-5.11 (m, 4H), 5.86-6.01 (m, 2H), 6.86 (d, 4H), 7.11 (d, 4H)

Synthesis Example 5

Synthesis of Compound 6 (C6): [Reaction Formula (11)]

An organic fluorine compound FOMBLIN Zdol whose number average molecular weight (Mn) is approximately 1300 (manufactured by Solvay Specialty Polymers) (1.3 g, 1.0 mmol) and triethylamine (0.59 g, 5.8 mmol) were added to dichloromethane (15 mL), and then 4-ethenylbenzoyl chloride (0.50 g, 3.0 mmol) was added while cooling using an ice bath. Next, after removing the ice bath, it was stirred at room temperature for 2 hours. Next, the reaction mixture was washed twice with water, dried by adding magnesium sulfate, and then filtered. Next, the filtrate was concentrated with a rotary evaporator to obtain a crude product (1.7 g) as a cloudy oily substance. Next, through purification by silica gel column chromatography (developing solvent:hexane-ethyl acetate (9:1)), a compound 6 (C6) was obtained as a colorless oily substance (0.89 g, 0.57 mmol, yield 56%).

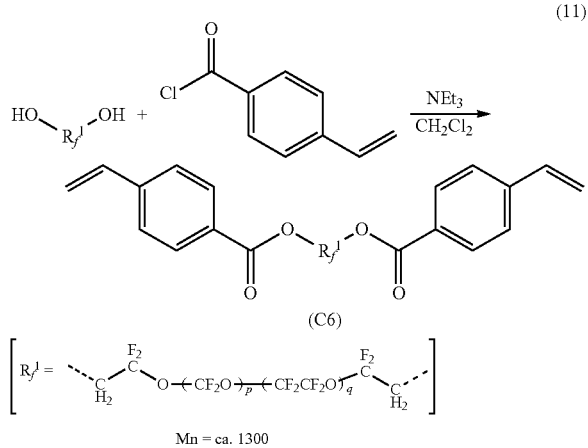

(C6)

Mn = ca. 1300

Here, p and q are an average degree of polymerization and the order of (CF$_2$O) and (CF$_2$CF$_2$O) in R$_f^1$ is arbitrary.

It was confirmed by the peaks of $^1$H-NMR spectrum that the colorless oily substance was the compound 6.

Peaks of $^1$H-NMR spectrum δ [ppm]: 4.75 (br, 4H), 5.44 (d, 2H), 5.92 (d, 2H), 6.73-6.83 (m, 2H), 7.48 (d, 4H), 7.99 (d, 4H)

Synthesis Example 6

Synthesis of Compound 7 (C7): [Reaction Formula (12)]

An organic fluorine compound FOMBLIN Zdol whose number average molecular weight (Mn) is approximately 1300 (manufactured by Solvay Specialty Polymers) (0.65 g, 0.50 mmol) and triethylamine (0.26 g, 2.6 mmol) were added to dichloromethane (10 mL), and then 4-(3-buten-1-yl) benzoyl chloride (0.25 g, 1.3 mmol) was added while cooling using an ice bath. Next, after removing the ice bath, it was stirred at room temperature for 18 hours. Next, the reaction mixture was washed twice with water, dried by adding magnesium sulfate, and then filtered. Next, the filtrate was concentrated with a rotary evaporator to obtain a crude product (0.83 g) as a yellow brown oily substance. Next, through purification by silica gel column chromatography (developing solvent:hexane-ethyl acetate (19:1)), a compound 7 (C7) was obtained as a colorless oily substance (0.53 g, 0.33 mmol, yield 66%).

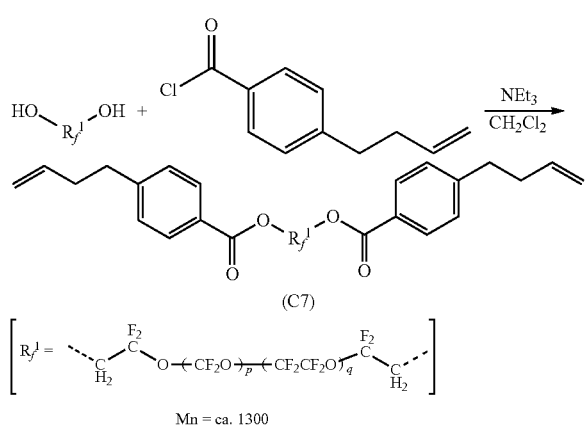

(C7)

Mn = ca. 1300

Here, p and q are an average degree of polymerization and the order of (CF$_2$O) and (CF$_2$CF$_2$O) in R$_f^1$ is arbitrary.

It was confirmed by the peaks of $^1$H-NMR spectrum that the colorless oily substance was the compound 7.

Peaks of $^1$H-NMR spectrum δ [ppm]: 2.39 (td, 4H), 2.78 (t, 4H), 4.67 (br, 4H), 4.97-5.08 (m, 4H), 5.75-5.90 (m, 2H), 7.28 (d, 4H), 7.97 (d, 4H)

Synthesis Example 7

Synthesis of Compound 8 (C8): [Reaction Formula (13)]

An organic fluorine compound FOMBLIN Zdol whose number average molecular weight (Mn) is approximately 1300 (manufactured by Solvay Specialty Polymers) (0.98 g, 0.75 mmol) and triethylamine (0.34 g, 3.4 mmol) were added to dichloromethane (15 mL), and then 4-ethynylbenzoyl chloride (0.37 g, 2.2 mmol) was added while cooling using an ice bath. Next, after removing the ice bath, it was stirred at room temperature for 16 hours. Next, the reaction mixture was washed twice with water, dried by adding magnesium sulfate, and then filtered. Next, the filtrate was concentrated with a rotary evaporator to obtain a crude product (0.67 g) as a cloudy oily substance. Next, through purification by silica gel column chromatography (developing solvent:hexane-ethyl acetate (9:1)), a compound 8 (C8) was obtained as a colorless oily substance (0.41 g, 0.26 mmol, yield 35%).

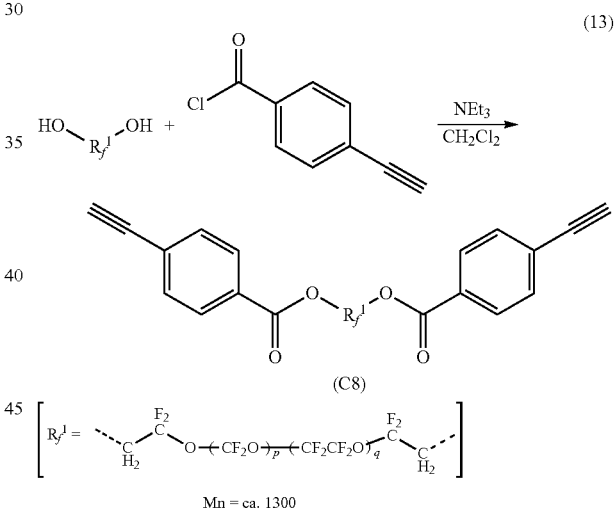

(C8)

Mn = ca. 1300

Here, p and q are an average degree of polymerization and the order of (CF$_2$O) and (CF$_2$CF$_2$O) in R$_f^1$ is arbitrary.

It was confirmed by the peaks of $^1$H-NMR spectrum that the colorless oily substance was the compound 8.

Peaks of $^1$H-NMR spectrum δ [ppm]: 3.26 (s, 2H), 4.68 (br, 4H), 7.58 (d, 4H), 8.01 (d, 4H)

Synthesis Example 8

Synthesis of Compound 9 (C9): [Reaction Formula (14)]

An organic fluorine compound FOMBLIN Zdol whose number average molecular weight (Mn) is approximately 2000 (manufactured by Solvay Specialty Polymers) (2.1 g, 1.0 mmol) and p-allylphenyl glycidyl ether (0.41 g, 2.1 mmol) were added to t-butyl alcohol (1 mL), and then potassium (t-butoxide) (0.24 g, 2.1 mmol) was added and stirring was conducted at 75° C. for 16 hours. Next, the reaction mixture was separated by dilute hydrochloric acid (20 mL) and a fluorine-based solvent AK-225 (manufactured by Asahi Glass Co., Ltd) (20 mL), and then the aqueous phase was extracted twice by AK-225 (20 mL). After adding magnesium sulfate to the organic phase to dry, it was filtered. Next, the filtrate was concentrated by a rotary evaporator to obtain a crude product (2.3 g) as a pale yellow oily substance. Next, through purification by silica gel column chromatography (developing solvent:hexane-ethyl acetate (3:1)), a compound 9 (C9) was obtained as a colorless oily substance (1.1 g, 0.46 mmol, yield 45%).

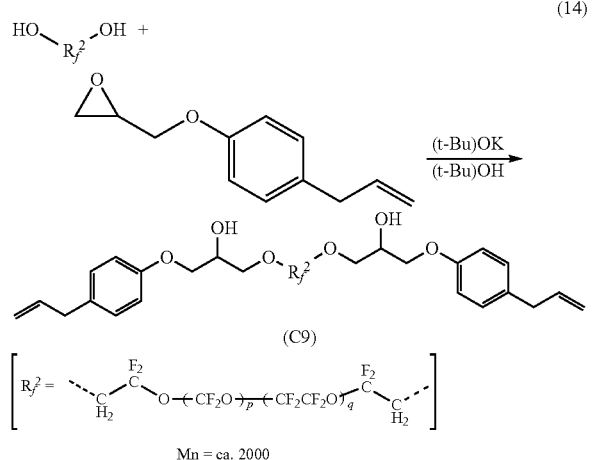

(14)

Here, p and q are an average degree of polymerization and the order of $(CF_2O)$ and $(CF_2CF_2O)$ in $R_f^1$ is arbitrary.

It was confirmed by the peaks of $^1$H-NMR spectrum that the colorless oily substance was the compound 9.

Peaks of $^1$H-NMR spectrum δ [ppm]: 3.32 (d, 4H), 3.84-4.24 (m, 14H), 5.01-5.09 (m, 4H), 5.86-6.02 (m, 2H), 6.80 (d, 4H), 7.07 (d, 4H)

Synthesis Example 9

Synthesis of Compound 10 (C10): [Reaction Formula (15)]

An organic fluorine compound FOMBLIN Zdol whose number average molecular weight (Mn) is approximately 2000 (manufactured by Solvay Specialty Polymers) (2.0 g, 1.0 mmol) and 2-(((1-(2-propen-1-yl)-2-naphthalenyl) oxy) methyl) oxirane (0.48 g, 2.0 mmol) were added to t-butyl alcohol (1 mL), and then potassium (t-butoxide) (0.24 g, 2.1 mmol) was added and stirring was conducted at 75° C. for 19 hours. Next, the reaction mixture was separated by dilute hydrochloric acid (20 mL) and a fluorine-based solvent AK-225 (manufactured by Asahi Glass Co., Ltd) (20 mL), and then the aqueous phase was extracted twice by AK-225 (20 mL). After adding magnesium sulfate to the organic phase to dry, it was filtered. Next, the filtrate was concentrated by a rotary evaporator to obtain a crude product (2.2 g) as a pale yellow oily substance. Next, through purification by silica gel column chromatography (developing solvent: hexane-ethyl acetate (7:3)), a compound 10 (C10) was obtained as a colorless oily substance (1.1 g, 0.44 mmol, yield 44%).

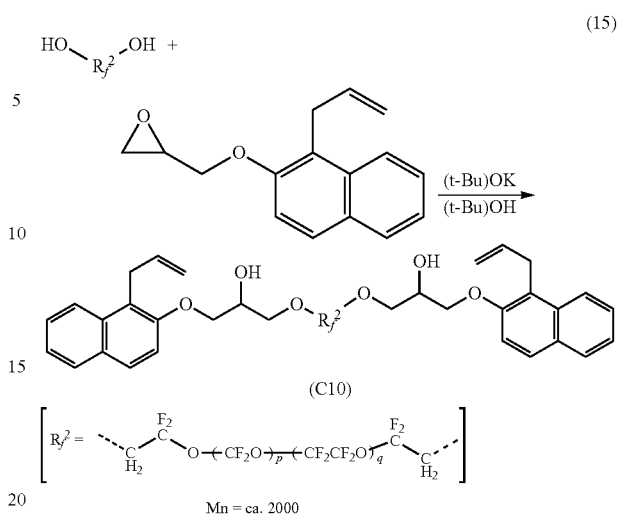

(15)

Here, p and q are an average degree of polymerization and the order of $(CF_2O)$ and $(CF_2CF_2O)$ in $R_f^1$ is arbitrary.

It was confirmed by the peaks of $^1$H-NMR spectrum that the colorless oily substance was the compound 10.

Peaks of $^1$H-NMR spectrum δ [ppm]: 3.85 (d, 4H), 3.96-4.13 (m, 8H), 4.27-4.38 (m, 6H), 5.01-5.07 (m, 4H), 5.98-6.13 (m, 2H), 7.26-7.35 (m, 4H), 7.44 (dd, 2H), 7.62-7.69 (m, 4H), 7.86 (d, 2H)

Synthesis Example 10

Synthesis of Compound 11 (C11): [Reaction Formula (16)]

An organic fluorine compound FOMBLIN Zdol whose number average molecular weight (Mn) is approximately 1300 (manufactured by Solvay Specialty Polymers) (2.6 g, 2.0 mmol) and 2-(((1-(2-propen-1-yl)-2-naphthalenyl) oxy) methyl) oxirane (0.58 g, 2.4 mmol) were added to t-butyl alcohol (1 mL), and then potassium (t-butoxide) (0.27 g, 2.4 mmol) was added and stirring was conducted at 75° C. for 3 hours. Next, the reaction mixture was separated by dilute hydrochloric acid (20 mL) and a fluorine-based solvent AK-225 (manufactured by Asahi Glass Co., Ltd) (20 mL), and then the aqueous phase was extracted twice by AK-225 (20 mL). After adding magnesium sulfate to the organic phase to dry, it was filtered. Next, the filtrate was concentrated by a rotary evaporator to obtain a crude product (3.2 g) as a pale yellow oily substance. Next, through purification by silica gel column chromatography (developing solvent: hexane-ethyl acetate (3:1)), a compound 11 (C11) was obtained as a colorless oily substance (2.0 g, 1.3 mmol, yield 66%).

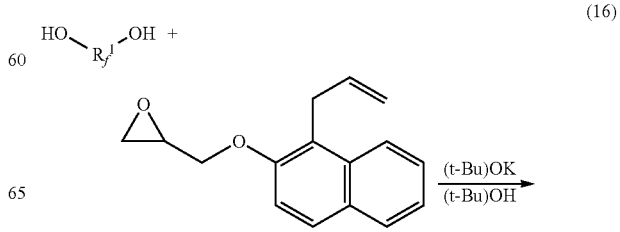

(16)

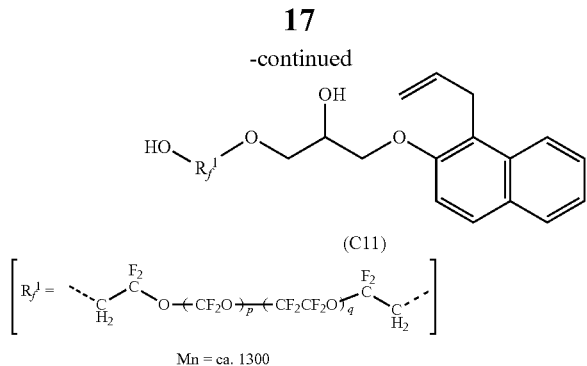

(C11)

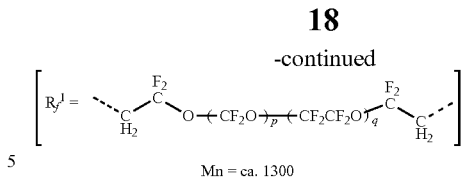

Mn = ca. 1300

Here, p and q are an average degree of polymerization and the order of (CF$_2$O) and (CF$_2$CF$_2$O) in R$_f^1$ is arbitrary.

It was confirmed by the peaks of $^1$H-NMR spectrum that the colorless oily substance was the compound 11.

Peaks of $^1$H-NMR spectrum δ [ppm]: 3.85 (d, 2H), 4.00-4.10 (m, 6H), 4.26-4.36 (m, 3H), 4.99-5.06 (m, 2H), 5.98-6.10 (m, 1H), 7.28-7.35 (m, 3H), 7.45 (dd, 1H), 7.63-7.70 (m, 2H), 7.87 (d, 1H)

Synthesis Example 11

Synthesis of Compound 12 (C12): [Reaction Formula (17)]

The compound 11 (0.96 g, 0.62 mmol) obtained in the synthesis Example 10 and allyl glycidyl ether (90 mg, 0.79 mmol) were added to t-butyl alcohol (0.4 mL), and then potassium (t-butoxide) was added (88 mg, 0.78 mmol) and stirring was conducted at 75° C. for 17 hours. Next, the reaction mixture was separated by dilute hydrochloric acid (20 mL) and a fluorine-based solvent AK-225 (manufactured by Asahi Glass Co., Ltd) (20 mL), and then the aqueous phase was extracted twice by AK-225 (20 mL). After adding magnesium sulfate to the organic phase to dry, it was filtered. Next, the filtrate was concentrated by a rotary evaporator to obtain a crude product (0.98 g) as a pale yellow oily substance. Next, through purification by silica gel column chromatography (developing solvent:hexane-ethyl acetate (3:1)), a compound 12 (C12) was obtained as a colorless oily substance (0.55 g, 0.33 mmol, yield 53%).

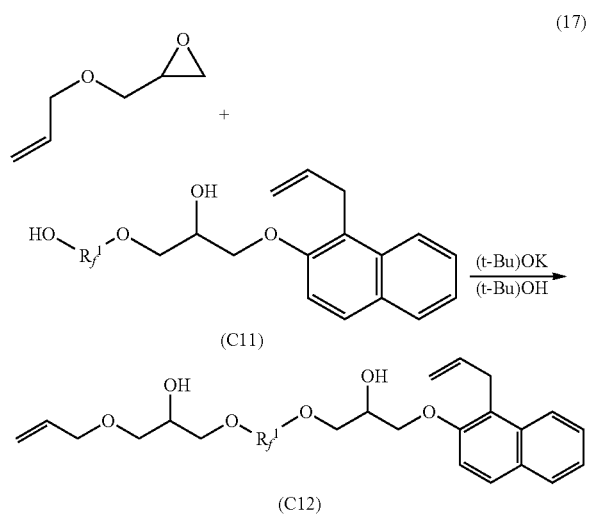

(17)

Mn = ca. 1300

Here, p and q are an average degree of polymerization and the order of (CF$_2$O) and (CF$_2$CF$_2$O) in R$_f^1$ is arbitrary.

It was confirmed by the peaks of $^1$H-NMR spectrum that the colorless oily substance was the compound 12.

Peaks of $^1$H-NMR spectrum δ [ppm]: 3.54-3.60 (m, 2H), 3.74-3.86 (m, 4H), 3.98-4.08 (m, 8H), 4.22-4.36 (m, 4H), 5.01-5.32 (m, 4H), 5.89-6.13 (m, 2H), 7.28-7.35 (m, 3H), 7.45 (dd, 1H), 7.63-7.70 (m, 2H), 7.87 (d, 1H)

Example 2

A protective layer made of DLC (Diamond-Like Carbon) was formed on a 2.5-inch glass plank for magnetic disk by a high-frequency magnetron sputtering method using carbon as a target in an Ar gas atmosphere, and a simulated disk was made.

Here, the content of nitrogen atoms in the protective layer of each simulated disk was measured using a scanning X-ray photoelectron spectrometer (XPS/ESCA) PHI Quantera II™ (manufactured by ULVAC-PHI, Inc.), and only simulated disks, which were guaranteed that the content of nitrogen atoms in the protective layer was 1 atom %, were used.

Next, as the lubricant, the compound 1 was dissolved in PF-5060 (tetradecafluorohexane) (manufactured by 3M Company) and a lubricant solution of 0.01% by mass was prepared.

The lubricant solution was then applied onto the protective layer of the simulated disk using a dipping method. That is, the lubricant solution was applied on the protective layer of the simulated disk by immersing the simulated disk in the lubricant solution placed in the immersion tank of a dipping coating machine and pulling up the simulated disk from the immersion tank. Next, after the surface coated with the lubricant solution was dried, ultraviolet light having wavelengths of 185 nm and 254 nm was irradiated for 2 seconds using a low-pressure mercury lamp EUV200 US-A2 (manufactured by SEN LIGHTS CORPORATION) to form a lubricant layer.

(Average Thickness of Lubricant Layer)

Using a Fourier transform infrared spectrometer Nicolet iS50 (manufactured by Thermo Fisher Scientific K.K), by a high sensitivity reflection method, the average thickness of the lubricant layer was obtained by measuring the intensity of an absorption peak corresponding to a stretching vibration energy of a C—F bond of the infrared absorption spectrum. Here, thicknesses at four points were measured for the lubricant layer, and an average value of these was determined as the average thickness.

(Bonded Ratio of Lubricant Layer)

The simulated disk, whose average thickness of the lubricant layer had been measured, was immersed in an immersion tank containing Vertrel (registered trademark) XF (1,1,1,2,3,4,4,5,5,5,5-decafluoropentane) (manufactured by Dupont-Mitsui Fluorochemicals Co., Ltd.) for 10 minutes. Thereafter, the simulated disk was pulled up to wash away lubricant that was not fixed to the protective layer of the simulated disk. Then, after the simulated disk was dried, the average thickness of the lubricant layer was determined in a manner similar to the above.

The ratio of the average thicknesses of the lubricant layer before and after the above process was determined as the bonded ratio.

Examples 4 to 9

The average thicknesses and bonded ratios of respective lubricant layer were evaluated similarly to Example 2 with the exception of respectively using the compound 6, the compound 7, the compound 8, the compound 9, the compound 10, the compound 10, and the compound 12 instead of the compound 1.

Comparative Example 1

The average thicknesses and the bonded ratio of the lubricant layer were evaluated similarly to Example 2 with the exception of using an organic fluorine compound FOMBLIN Ztetraol whose number average molecular weight (Mn) is approximately 2000 (manufactured by Solvay Specialty Polymers) (see the chemical formula (4)) instead of the compound 1.

Comparative Example 2

The average thicknesses and the bonded ratio of the lubricant layer were evaluated similarly to Example 2 with the exception of using, instead of the compound 1, a compound 13 (C13) that is represented by the following chemical formula.

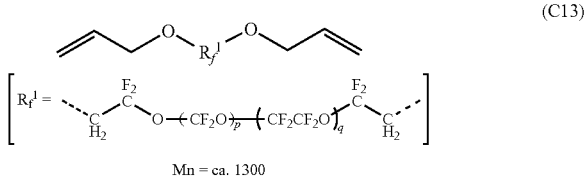

(C13)

Mn = ca. 1300

Here, p and q are an average degree of polymerization and the order of $(CF_2O)$ and $(CF_2CF_2O)$ in $R_f^1$ is arbitrary.

Note that the compound 13 was synthesized using a $S_N2$ reaction from an organic fluorine compound FOMBLIN Zdol whose number average molecular weight (Mn) is approximately 1300 (manufactured by Solvay Specialty Polymers) (see the chemical formula (3)) and allyl bromide.

Comparative Example 3

The average thicknesses and the bonded ratio of the lubricant layer were evaluated similarly to Example 2 with the exception of using, instead of the compound 1, a compound 14 (C14) that is represented by the following chemical formula.

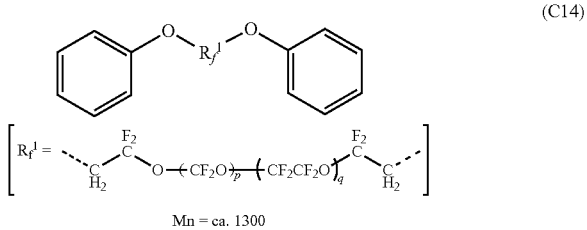

(C14)

Mn = ca. 1300

Here, p and q are an average degree of polymerization and the order of $(CF_2O)$ and $(CF_2CF_2O)$ in $R_f^1$ is arbitrary.

Note that the compound 14 was synthesized using a method similar to that of the synthesis example 1 from an organic fluorine compound FOMBLIN Zdol whose number average molecular weight (Mn) is approximately 1300 (manufactured by Solvay Specialty Polymers) (see the chemical formula (3)) and iodobenzene.

Table 1 indicates the evaluation result of the average thicknesses of the lubricant layers and the bonded ratios.

TABLE 1

| | ORGANIC FLUORINE COMPOUND | AVERAGE THICKNESS OF LUBRICANT LAYER [nm] | | BONDED RATIO [%] |
| --- | --- | --- | --- | --- |
| | | BEFORE BEING PROCESSED | AFTER BEING PROCESSED | |
| Example 2 | COMPOUND 1 | 0.84 | 0.76 | 90 |
| Example 4 | COMPOUND 6 | 0.96 | 0.91 | 95 |
| Example 5 | COMPOUND 7 | 0.88 | 0.77 | 88 |
| Example 6 | COMPOUND 8 | 0.91 | 0.87 | 96 |
| Example 7 | COMPOUND 9 | 0.95 | 0.81 | 85 |
| Example 8 | COMPOUND 10 | 1.01 | 0.95 | 94 |
| Example 9 | COMPOUND 12 | 0.88 | 0.81 | 92 |
| Comparative Example 1 | CHEMICAL FORMULA (4) | 0.47 | 0.12 | 26 |
| Comparative Example 2 | COMPOUND 13 | 0.34 | 0.22 | 65 |
| Comparative Example 3 | COMPOUND 14 | 0.75 | 0.32 | 43 |

From Table 1, it can be seen that the compounds 1, 6 to 10, and 12 used in Example 2 and Examples 4 to 9 each can form a lubricant layer having a sufficient thickness on a protective layer that has not been subjected to a nitriding process and can increase the bonded ratio of the lubricant layer. At this time, it is considered that fixing of the lubricant layer is promoted by irradiating a compound having an alkenyl group or an alkynyl group with ultraviolet light.

In contrast, because the compound that is represented by the chemical formula (4) and the compound 13 used in Comparative Examples 1 and 2 do not have an aromatic ring in the molecule, a lubricant layer having a sufficient thickness cannot be formed on a protective layer to which a nitriding process is not applied.

Note that, from the bonded ratios of the lubricant layers of Comparative Example 1 and Comparative Example 2, it is suggested that fixing of the lubricant layer is promoted by irradiating the compound 13 having an allyl group with ultraviolet light.

In the compound 14 used in Comparative Example 3, the bonded ratio of the lubricant layer is a low value because an alkenyl or an alkynyl group is not directly attached to a phenyl group.

This result shows adsorption of a molecular structure containing an aryl group, in which an alkenyl group or an alkynyl group is directly attached on an aromatic ring, included in the compounds 1, 6 to 10, and 12 used in Example 2 and Examples 4 to 9, on a protective layer to which a nitriding process is not applied, and the effect of fixing of the lubricant layer by irradiation with ultraviolet light.

INDUSTRIAL APPLICABILITY

According to an organic fluorine compound according to the present embodiment, with respect to a substrate having a protective layer to which a nitriding process is not applied, a lubricant layer having a sufficient thickness can be formed by a dipping method, and by irradiating the lubricant layer with ultraviolet light, fixing of the lubricant layer can be promoted, and as a result, the bonded ratio of the lubricant layer can be increased.

The present international application is based on and claims priority to Japanese Patent Application No. 2017-128567, filed on Jun. 30, 2017, the entire contents of Japanese Patent Application No. 2017-128567 are hereby incorporated herein by reference.

The invention claimed is:

1. An organic fluorine compound that is represented by a general formula (R-π-E-CH$_2$)$_2$-A     (1A)

where A is a divalent perfluoropolyether group, π a is an arylene group or a single bond, R is an alkenyl group or an alkynyl group, and E is an ester bond or a group that is represented by a chemical formula

—OCH$_2$CH(OH)CH$_2$O— two groups each of which is represented by a general formula

R-π-E-CH$_2$— may be the same or different, and at least one π a among two π a is an arylene group.

2. The organic fluorine compound according to claim 1, wherein the A is a straight chain group.

3. The organic fluorine compound according to claim 1, wherein a plurality of the R are the same.

4. The organic fluorine compound according to claim 1, wherein a plurality of the π are the same.

5. The organic fluorine compound according to claim 1, wherein a plurality of the E are the same.

6. The organic fluorine compound according to claim 1, wherein a carbon number of the A is 1 to 100.

7. The organic fluorine compound according to claim 1, wherein the A includes at least one of groups each of which is represented by a general formula —(CF$_2$)$_x$O—     (2)

(where x is an integer of 1 to 5).

8. The organic fluorine compound according to claim 7, wherein the A includes 1 to 50 groups each of which is represented by the general formula (2) in which the x is 1 or 2.

9. The organic fluorine compound according to claim 1, wherein an average formula weight of the A is in a range of 250 to 6000.

10. The organic fluorine compound according to claim 1, wherein the organic fluorine compound is
a compound selected from the group consisting of a compound that is represented by a chemical formula

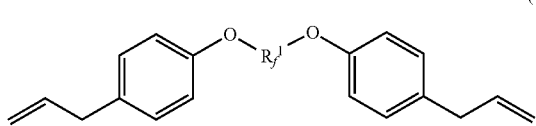

(C1)

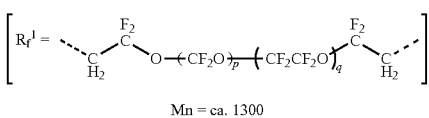

Mn = ca. 1300 a compound that is represented by a chemical formula

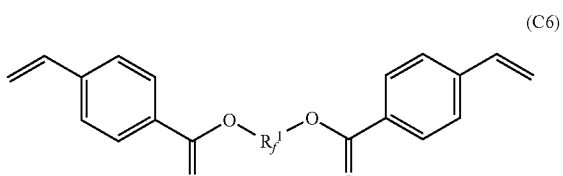

(C6)

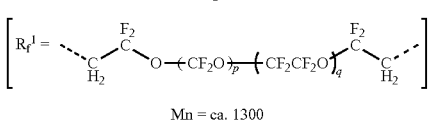

Mn = ca. 1300 a compound that is represented by a chemical formula

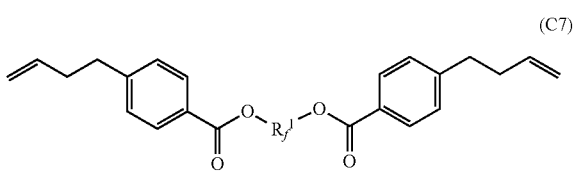

(C7)

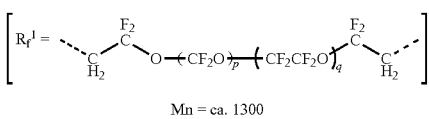

Mn = ca. 1300 a compound that is represented by a chemical formula

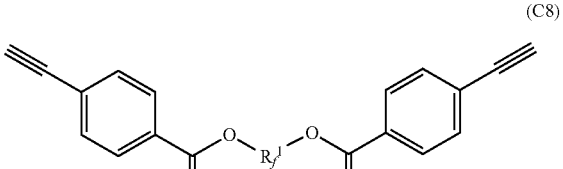

(C8)

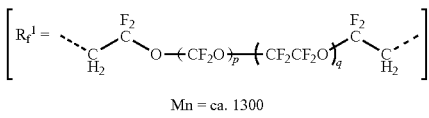

Mn = ca. 1300 a compound that is represented by a chemical formula

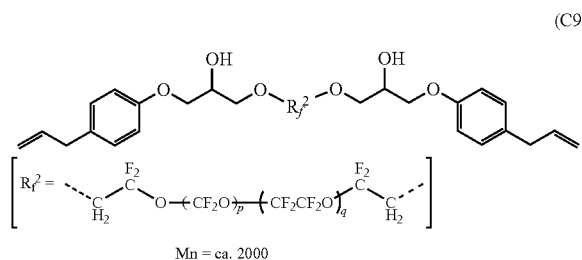

(C9)

a compound that is represented by a chemical formula

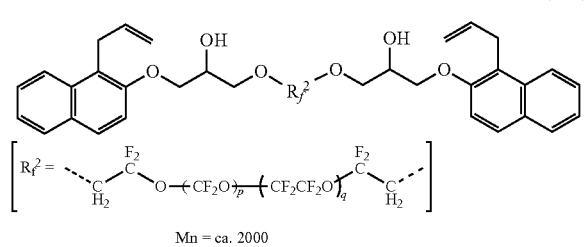

(C10)

or a compound that is represented by a chemical formula

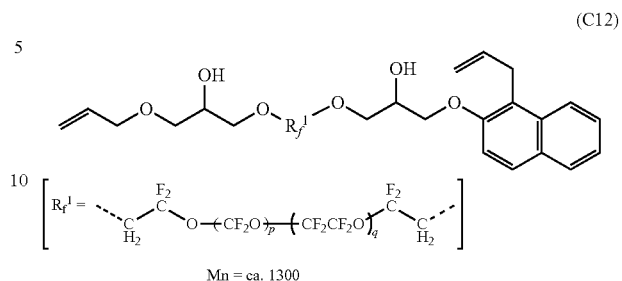

(C12)

said Mn being an approximate average molecular weight, said ca. being circa, and each of said p and q being integers greater than or equal to 1.

11. A lubricant containing the organic fluorine compound according to claim 1.

12. A processing method of a magnetic recording medium comprising:
applying the lubricant according to claim 11 to the magnetic recording medium; and
irradiating the lubricant applied to the magnetic recording medium with ultraviolet light.

* * * * *